May 28, 1957 — E. L. STROUP — 2,793,690
UPWARDLY ACTING DOOR ASSEMBLIES
Filed Dec. 8, 1955
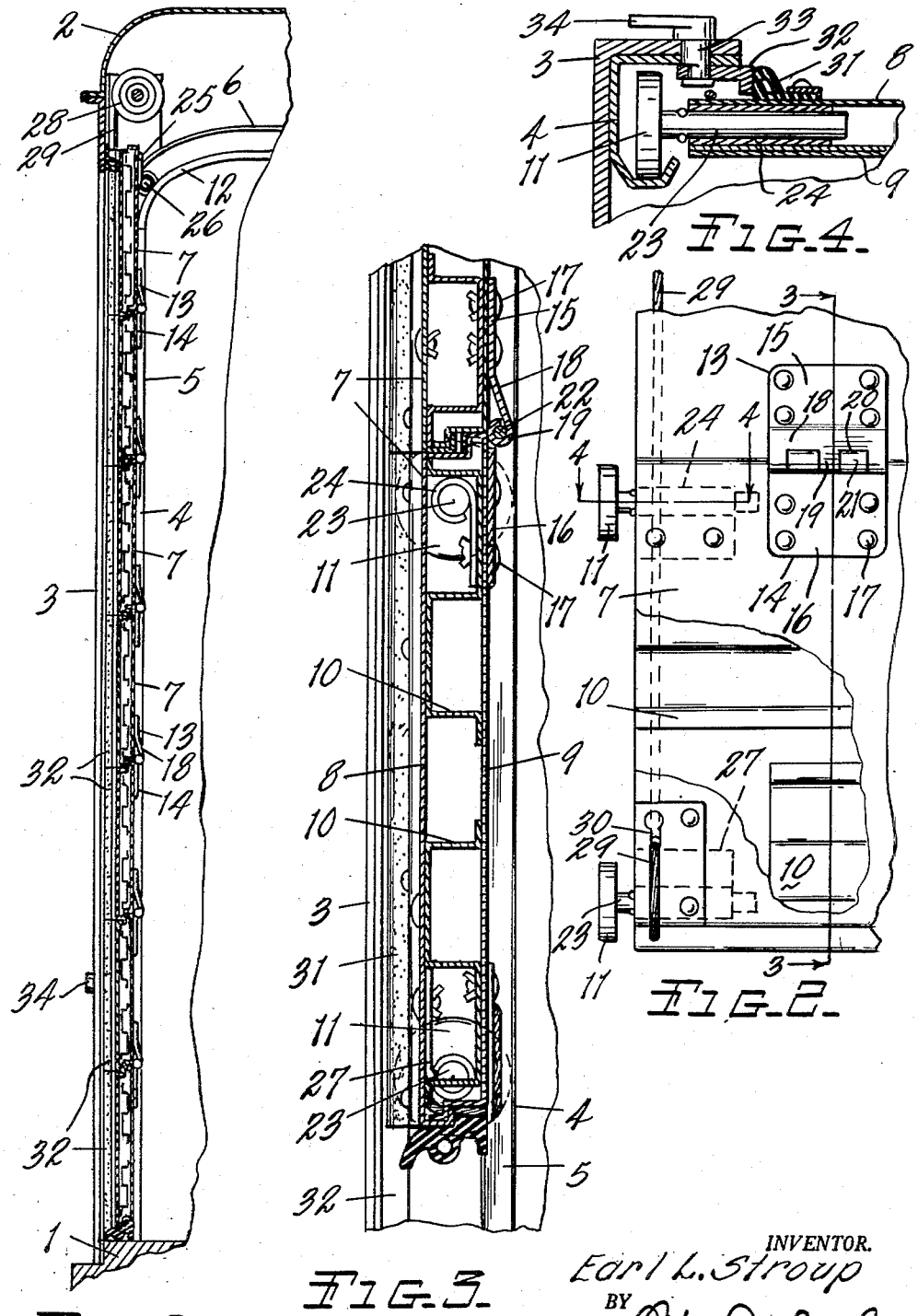
INVENTOR.
Earl L. Stroup
BY
Otis A. Earl
Attorney

United States Patent Office 2,793,690
Patented May 28, 1957

2,793,690
UPWARDLY ACTING DOOR ASSEMBLIES

Earl L. Stroup, Hartford City, Ind., assignor to Overhead Door Corporation, Hartford City, Ind.

Application December 8, 1955, Serial No. 551,899

8 Claims. (Cl. 160—201)

This invention relates to an upwardly acting door assembly of the hingedly connected section type which is well adapted for use in trucks, trailers and like mobile vehicles.

The main objects of the invention are:

First, to provide an upwardly acting door assembly comprising a plurality of hingedly connected sections in which the inner surfaces of the sections are smooth or flat and lie in substantially the same plane when the door is closed, the sections being connected so that there is minimum obstruction to the opening of the door in the event a load should shift against the inner side thereof.

Second, to provide an upwardly acting door assembly comprising a track, a plurality of hingedly connected sections and track engaging rollers which effectively support the sections and at the same time the mounting or spindles for the rollers are so arranged that the sections are properly guided and supported and the mounting for the rollers is protected from injury.

Third, to provide an upwardly acting door of the sectional type having a substantially smooth interior surface when the door is in closed position and one in which the hinging and guiding parts are effectively protected against injury by a load shifting against the same.

Objects relating to details and economies of the invention will appear from the description to follow. The invention is defined and pointed out in the claims.

A preferred embodiment of the invention is illustrated in the accompanying drawing, in which:

Fig. 1 is a fragmentary vertical section of a door assembly embodying my invention as embodied in a truck or trailer.

Fig. 2 is an enlarged fragmentary inside elevational view.

Fig. 3 is an enlarged fragmentary vertical sectional view on a line corresponding to line 3—3 of Fig. 2.

Fig. 4 is an enlarged fragmentary view mainly in section on a line corresponding to line 4—4 of Fig. 2.

In the accompanying drawing I have illustrated my invention as embodied in a truck or trailer structure, in which 1 represents the floor or bed and 2 the housing. These parts are shown conventionally and for the purpose of illustrating the door in operative relation to other parts. 3 represents a side door frame member and 4 a channel type of track which is mounted on the inner side of the door frame member and comprises vertical sections designated by the numeral 5 and horizontal sections designated by the numeral 6.

I have illustrated only one track and parts associated therewith but it will be understood that the parts are duplicated at the opposite edge of the door.

The door comprises a plurality of sections 7, which are preferably duplicates, the sections 7 comprising outer panels 8, inner panels 9 and reinforcing members 10 interposed between the panels and extending lengthwise thereof.

The door section structure, as such, is that illustrated in my application for Letters Patent Serial No. 525,160 filed July 29, 1955; as it is described in detail in that application and claims are directed thereto, I do not further describe the same herein.

The door sections are provided with track engaging rollers 11, the door being supported in closed position by the vertical portion of the track and in open position by the horizontal portions of the track. The vertical and horizontal portions of the track are connected by intermediate curved portions 12. To permit movement from closed to open position and vice versa the door sections are connected by hinges arranged on the inner sides thereof.

Inasmuch as the loads in trucks, trailers and the like may shift against the inner side of the door it is important not only that the inner sides of the door sections be in the same plane when the door is in closed position but also that there are no projecting portions to engage a shifted load and thereby prevent the opening of the door. To this end I provide special hinges comprising the upper hinge members 13 and lower hinge members 14, both formed of sheet metal stamping and comprising flat body portions 15 and 16 respectively which are secured to the door sections as by rivets 17.

The hinge members 15 are provided with inwardly and downwardly projecting arms 18 which terminate in inturned knuckles 19. These knuckles have slots 20 therein which receive the outturned knuckles 21 of the lower hinge member 14. The pintles 22 engage these knuckles. The inturned knuckles of the upper hinge members are in supported engagement with the sides of the door sections while the body portions of the lower hinge members are supported against the door substantially throughout the area thereof. This provides a hinge structure which projects only slightly and in the event a load should shift against the inner side of the door the projecting arms 18 engage the load with a camming or wedging action so that the door may be opened.

The rollers 11 are provided with spindles 23 which project through the edges of the door sections into supported engagement with the spindle supports 24 on the brackets 25 which are positioned within the door sections and closely adjacent the upper edges thereof. The supporting brackets 25 for the spindles 26 on the upper rollers are located on the inner side of the upper panel adjacent the top edge thereof and engage the curved portion of the track when the door is closed so that the door is effectively guided onto the horizontal portion of the track.

To support the lower section of the door brackets 27, which preferably are the same structure as the brackets 25, are positioned within the lower section adjacent the bottom edge thereof as is shown in Figs. 2 and 3. The spindles of the bottom rollers project through the edge of the door. With this arrangement the door is supported and guided for free opening and closing and the hinging and guiding parts are effectively protected.

In the embodiment illustrated a counterbalance 28 is provided, the counterbalancing cable 29 being connected to the counterbalancing means and to the lower section at 30. In the embodiment illustrated I provide the door sections with resiliently flexible seal members 31 to coact therewith and I provide the sealing strips 32 which are adjustably mounted on the door frame member 3. The strips are eccentrically engaged with the rotatable supports 33 provided with hand pieces 34. It is desirable that the door be completely closed before the seals are sealingly adjusted to position and that the seals be released before the door is opened.

I have illustrated and described my invention in a highly practical commercial embodiment thereof. I have not attempted to illustrate and describe other modifications or adaptations as it is believed this disclosure will enable those skilled in the art to embody or adapt my invention as may be desired.

Having thus described the invention, what is claimed as new and is desired to be secured by Letters Patent is:

1. An upwardly acting door assembly comprising a track, a plurality of chambered door sections of uniform thickness and having flat inner panels disposed in substantially the same plane when the door is closed, connecting hinges for the sections comprising upper and lower hinge members having flat plate like body portions disposed flat wise against the inner sides of the sections, the upper hinge members having downwardly projecting outwardly inclined arms terminating at their lower edges in inturned knuckles, the knuckles having slots therein, the lower hinge members having outturned longitudinally spaced knuckles on their upper edges disposed in said slots, pintles engaged with said knuckles, the knuckles of the upper hinge members being in supported engagement with the sides of the door sections on which the upper hinge members are mounted, spindle supporting brackets secured to said inner panels within said hingedly connected sections and having spindle holders disposed closedly adjacent the upper edges thereof, rollers positioned at the ends of the sections and having spindles disposed through the end edges of the sections and supportedly engaged with said spindle holders, the lower section of the door also having spindle supporting brackets disposed therein with the spindle holders thereof located closely adjacent the lower edge of the lower door section, and track engaging rollers provided with spindles disposed through the end edges of the lower door section and engaged with the said holders.

2. An upwardly acting door assembly comprising a track, a plurality of chambered door sections of uniform thickness and having flat inner panels disposed in substantially the same plane when the door is closed, connecting hinges for the sections comprising upper and lower hinge members having flat plate like body portions disposed flat wise against the inner sides of the sections, the upper hinge members having downwardly projecting outwardly inclined arms terminating at their lower edges in inturned knuckles, the knuckles having slots therein, the lower hinge members having outturned longitudinally spaced knuckles on their upper edges disposed in said slots, pintles engaged with said knuckles, the knuckles of the upper hinge members being in supported engagement with the sides of the door sections on which the upper hinge members are mounted, spindle supporting brackets secured to said inner panels within said hingedly connected sections and having spindle holders disposed closedly adjacent the upper edges thereof, rollers positioned at the ends of the sections and having spindles disposed through the end edges of the sections and supportedly engaged with said spindle holders.

3. An upwardly acting door assembly comprising a track, a plurality of chambered door sections having flat inner surfaces disposed in substantially the same plane when the door is closed, connecting hinges for the sections comprising upper and lower hinge members having flat plate like body portions disposed flat wise against the inner sides of the sections, the upper hinge members having downwardly projecting outwardly inclined arms terminating at their lower edges in knuckles, the knuckles having slots therein, the lower hinge members having knuckles on their upper edges, pintles engaged with said knuckles, the lower section of the door also having spindle supporting brackets disposed therein with the spindle holders thereof located closely adjacent the lower edge of the lower door section, and track engaging rollers provided with spindles disposed through the end edges of the lower door section and engaged with the said spindle holders.

4. An upwardly acting door assembly comprising a track, a plurality of chambered door sections having flat inner surfaces disposed in substantially the same plane when the door is closed, connecting hinges for the sections comprising upper and lower hinge members having flat plate like body portions disposed flat wise against the inner sides of the sections, the upper hinge members having downwardly projecting outwardly inclined arms terminating at their lower edges in knuckles, and knuckles having slots therein, the lower hinge members having knuckles on their upper edges, pintles engaged with said knuckles, spindle supporting brackets disposed within said hingedly connected sections and having spindle holders disposed closedly adjacent the upper edges thereof, rollers positioned at the ends of the sections and having spindles disposed through the end edges of the sections and supportedly engaged with said spindle holders.

5. An upwardly acting door assembly comprising a track, a plurality of chambered door sections having flat inner surfaces disposed in substantially the same plane when the door is closed, connecting hinges for the sections comprising upper and lower hinge members having flat plate like body portions disposed flat wise against the inner sides of the sections, the upper hinge members having downwardly projecting outwardly inclined arms having inturned knuckles at their lower edges, the lower hinge members having coacting knuckles on their upper edges, pintles engaging said knuckles, spindle holders disposed within said hingedly connected sections adjacent the upper edges thereof, rollers positioned at the ends of the sections and having spindles disposed through the end edges of the sections and supportedly engaged with said holders, the lower section of the door also having spindle supporting holders therein disposed adjacent its lower edge, and track engaging rollers provided with spindles disposed through the end edges of the lower door section and engaged with said holders.

6. An upwardly acting door assembly comprising a track, a plurality of chambered door sections having flat inner surfaces disposed in substantially the same plane when the door is closed, connecting hinges for the sections comprising upper and lower hinge members having flat plate like body portions disposed flat wise against the inner sides of the sections, the upper hinge members having downwardly projecting outwardly inclined arms having inturned knuckles at their lower edges, the lower hinge members having coacting knuckles on their upper edges, pintles engaging said knuckles, spindle holders disposed withing said hingedly connected sections adjacent the upper edges thereof, rollers positioned at the ends of the sections and having spindles disposed through the end edges of the sections and supportedly engaged with said holders.

7. An upwardly acting door assembly comprising a track, a plurality of chambered door sections having flat inner walls exposed on both sides along their vertical edges, connecting hinges for the sections, spindle supporting brackets disposed within said hingedly connected sections and having pintle bearings disposed closely adjacent the upper edges thereof, rollers positioned at the ends of the sections and having spindles disposed through the end edges of the sections and supportedly engaged with said bearings, the lower section of the door also having spindle supporting brackets disposed therein with the spindle holders thereof located closely adjacent the lower edge of the lower door section, and track engaging rollers provided with spindles disposed through the end edges of the lower door section and engaged with the said spindle holders.

8. An upwardly acting door assembly comprising a track, a plurality of chambered door sections having flat inner walls exposed on both sides along their vertical edges, connecting hinges for the sections, spindle supporting brackets disposed within said hingedly connected sections and having spindle holders disposed closely adjacent the upper edges thereof, and rollers positioned at the ends of the sections and having spindles disposed through the end edges of the sections and supportedly engaged with said spindle holders.

References Cited in the file of this patent

UNITED STATES PATENTS 2,391,845    Rowe                 Dec. 25, 1945
2,557,753    Mitchell             June 19, 1951